(12) United States Patent
Chen et al.

(10) Patent No.: US 11,939,808 B2
(45) Date of Patent: Mar. 26, 2024

(54) AUTOMATIC DOOR OPERATOR AND DRIVE MECHANISM THEREOF

(71) Applicant: Assa Abloy Entrance Systems AB, Landskrona (SE)

(72) Inventors: Yong Chen, Suzhou Jiangsu (CN); Jingfeng Zhang, Suzhou Jiansu (CN)

(73) Assignee: Assa Abloy Entrance Systems AB, Landskrona (SE)

( * ) Notice: Subject to any disclaimer, the term of this patent is extended or adjusted under 35 U.S.C. 154(b) by 77 days.

(21) Appl. No.: 17/442,376

(22) PCT Filed: Mar. 27, 2020

(86) PCT No.: PCT/EP2020/058765
§ 371 (c)(1),
(2) Date: Sep. 23, 2021

(87) PCT Pub. No.: WO2020/201112
PCT Pub. Date: Oct. 8, 2020

(65) Prior Publication Data
US 2022/0170307 A1 Jun. 2, 2022

(30) Foreign Application Priority Data
Apr. 3, 2019 (CN) .......................... 201910267556.X

(51) Int. Cl.
*E05F 15/00* (2015.01)
*E05F 15/63* (2015.01)

(52) U.S. Cl.
CPC ......... *E05F 15/63* (2015.01); *E05Y 2201/434* (2013.01); *E05Y 2201/624* (2013.01);
(Continued)

(58) Field of Classification Search
CPC ............... E05F 15/63; E05Y 2201/434; E05Y 2201/438; E05Y 2201/622;
(Continued)

(56) References Cited

U.S. PATENT DOCUMENTS 7,316,046 B2 * 1/2008 Michaels ............... A47K 11/10
15/210.1
8,407,937 B2 * 4/2013 Houser ................... E05F 15/63
49/346
(Continued)

FOREIGN PATENT DOCUMENTS

CN 104976287 10/2015
CN 204775440 11/2015
(Continued)

OTHER PUBLICATIONS

International Search Report in PCT/EP2020/058765, dated Jun. 26, 2020.
(Continued)

*Primary Examiner* — Chi Q Nguyen
(74) *Attorney, Agent, or Firm* — Wissing Miller LLP

(57) ABSTRACT

An automatic door operator and a drive mechanism thereof are disclosed. The drive mechanism of the automatic door includes a planetary reducer driven by an electric motor, and a drive shaft driven by a planetary reducer. The planetary reducer includes a housing and a planetary gear train mounted in the housing. The planetary gear train includes a final-stage planet carrier configured to output torque, and a center of the final-stage planet carrier is provided with a torque output hole. A first end of the drive shaft is detachably inserted in the torque output hole and is non-rotatably connected to the torque output hole, and a second end of the drive shaft extends out of the housing. The drive mechanism
(Continued)

of the automatic door operator is advantageous to the miniaturization design of the automatic door operator.

9 Claims, 1 Drawing Sheet

(52) U.S. Cl.
CPC ..... *E05Y 2201/628* (2013.01); *E05Y 2201/70* (2013.01); *E05Y 2201/702* (2013.01); *E05Y 2201/72* (2013.01); *E05Y 2900/132* (2013.01)

(58) Field of Classification Search
CPC ......... E05Y 2201/624; E05Y 2201/628; E05Y 2201/632; E05Y 2201/636; E05Y 2201/70; E05Y 2201/702; E05Y 2201/706; E05Y 2201/72; E05Y 2201/726; E05Y 2900/132
See application file for complete search history.

(56) References Cited

U.S. PATENT DOCUMENTS

| | | | |
|---|---|---|---|
| 11,390,979 B2* | 7/2022 | An | F16H 1/28 |
| 2002/0026750 A1 | 3/2002 | St. John et al. | |
| 2007/0051046 A1* | 3/2007 | Yoshida | E05F 15/63 |
| | | | 49/340 |
| 2009/0265992 A1* | 10/2009 | Hass | E05F 15/63 |
| | | | 318/610 |
| 2012/0023824 A1* | 2/2012 | Mason | E05F 15/622 |
| | | | 49/340 |
| 2016/0024834 A1* | 1/2016 | Nagao | B23Q 11/0891 |
| | | | 49/404 |
| 2017/0198515 A1 | 7/2017 | Sasaki | |
| 2018/0105970 A1* | 4/2018 | Basheer | A47L 15/44 |
| 2018/0266033 A1* | 9/2018 | Liu | F16H 1/2809 |
| 2019/0010746 A1 | 1/2019 | Sakiyama et al. | |
| 2020/0087972 A1* | 3/2020 | Ueda | E05F 15/652 |
| 2020/0215883 A1* | 7/2020 | Noguchi | B60J 5/0472 |
| 2020/0217122 A1* | 7/2020 | Noguchi | E05F 15/63 |
| 2021/0025213 A1* | 1/2021 | Noguchi | B60J 5/047 |

FOREIGN PATENT DOCUMENTS

| | | |
|---|---|---|
| CN | 105485270 | 4/2016 |
| CN | 106661909 | 5/2017 |
| CN | 210113357 | 2/2020 |
| WO | 2008132220 | 11/2008 |

OTHER PUBLICATIONS

Chinese Office Action in 2020800270076, dated Dec. 5, 2022.
Fundamentals of mechanical design (second edition), dated Feb. 1, 2006.

* cited by examiner

AUTOMATIC DOOR OPERATOR AND DRIVE MECHANISM THEREOF

This application is a 371 of PCT/EP2020/058765, filed on Mar. 27, 2020, published on Oct. 8, 2020 under publication number WO 2020/201112, which claims priority benefits from Chinese Patent Application No. 201910267556X, filed on Apr. 3, 2019, the disclosure of which is incorporated herein by reference.

TECHNICAL FIELD

The present disclosure relates to an automatic door operator and a drive mechanism thereof.

BACKGROUND

Automatic door operator is broadly used in the field of automatic door opening and closing. The automatic door operator includes a rockerarm connecting shaft configured to output torque, and the rockerarm connecting shaft is connected to a rocker arm system which is positioned outside the automatic door operator and is connected to the door. When the automatic door operator is working, the rockerarm connecting shaft can be controlled to rotate forward or backward, thereby controlling the rocker arm system to drive the door to open or close.

A typical drive mechanism of automatic door operator driven by electricity power includes a planetary reducer that is driven by an electric motor and a drive shaft that is driven by the planetary reducer. The planetary reducer includes a housing, a planetary gear train mounted in the housing, and an output shaft extending from the housing. The output shaft of the planetary reducer is integrated with the final-stage planet carrier of the planetary gear train, so that the final-stage planet carrier outputs torque via the output shaft, in order to transmit the torque to the drive shaft which is completely outside the housing of the planetary reducer. When the automatic door operator is working, the torque output from the motor is transmitted to the planetary reducer and then output from the output shaft of the planetary reducer. The output shaft of the planetary reducer is non-rotatably connected to the drive shaft via a coupling that is outside the planetary reducer housing. Then the drive shaft transmits the torque to the rockerarm connecting shaft directly or indirectly by an intermediate member. This kind of drive mechanism needs to occupy a large axial space, which is detrimental to the miniaturization design of the automatic door operator.

SUMMARY

The present disclosure aims to provide a drive mechanism of an automatic door operator, in order to facilitate the miniaturization design of the automatic door operator.

In one aspect of the present disclosure, a drive mechanism applied to an automatic door operator is disclosed. The drive mechanism includes a planetary reducer driven by an electric motor, and a drive shaft driven by the planetary reducer. The planetary reducer includes a housing and a planetary gear train mounted in the housing. The planetary gear train includes a final-stage planet carrier configured to output torque, and a center of the final-stage planet carrier is provided with a torque output hole. A first end of the drive shaft is detachably inserted in the torque output hole and is non-rotatably connected to the torque output hole, and a second end of the drive shaft extends out of the housing.

Further, the first end of the drive shaft is provided with a first cutting surface, and the torque output hole is provided with a second cutting surface, the first cutting surface being engaged to the second cutting surface so that relative rotation between the torque output hole and the drive shaft is limited.

Further, the drive shaft is configured as a bevel gear shaft, a lead screw or a worm.

Further, at least one bearing is sleeved on the drive shaft, and the bearing is adjacent to the first end of the drive shaft and is supported by a bearing seat mounted to the housing.

Further, the at least one bearing includes at least one pair of angular contact ball bearings disposed adjacent to each other.

Further, an inner surface of the bearing seat is provide with a first step configured to limit an outer ring of a first end of the bearing, and the bearing seat is screwed with an annular member configured to limit an outer ring of a second end of the bearing. The drive shaft is screwed with a nut, and a retaining ring is disposed between the nut and an inner ring of the first end of the bearing. The drive shaft is provided with a shoulder configured to limit an inner ring of the second end of the bearing.

Further, the nut is provided with a radial hole in which a set screw configured to abut against the drive shaft is mounted.

Further, the planetary gear train further includes a first-stage sun gear, a first-stage planet gear, a first-stage planet carrier, a second-stage sun gear and a second-stage planet carrier. An output shaft of the electric motor is connected to the first-stage sun gear, and the first-stage planet gear is mounted on the first-stage planet carrier and engaged with the first-stage sun gear. The second-stage sun gear and the first-stage planet carrier are attached together or integrally formed; the second-stage sun gear is engaged with the second-stage planet gear which is mounted on the final-stage planet carrier.

Further, a center of the first-stage planet carrier is provided with a through hole, a center of a first end face of the drive shaft is provided with a pin mounting hole, and a pin is mounted in the through hole and the pin mounting hole.

In the drive mechanism provided by the present disclosure, the planetary reducer is configured in such a way that no output shaft is provided, but a torque output hole is provided at the center of the final stage carrier, and the drive shaft is non-rotatably connected to the torque output hole of the final stage planet carrier directly. Therefore, the coupling for connecting the planetary reducer and the drive shaft can be omitted, thereby simplifying the configuration of the automatic door operator, facilitating to shorten an axial length of the automatic door operator, and further facilitating the miniaturization design of the automatic door operator while saving costs.

In another aspect of the present disclosure, an automatic door operator is provided. The automatic door operator is provided with the above-described drive mechanism.

DETAILED DESCRIPTION

Figure 1:
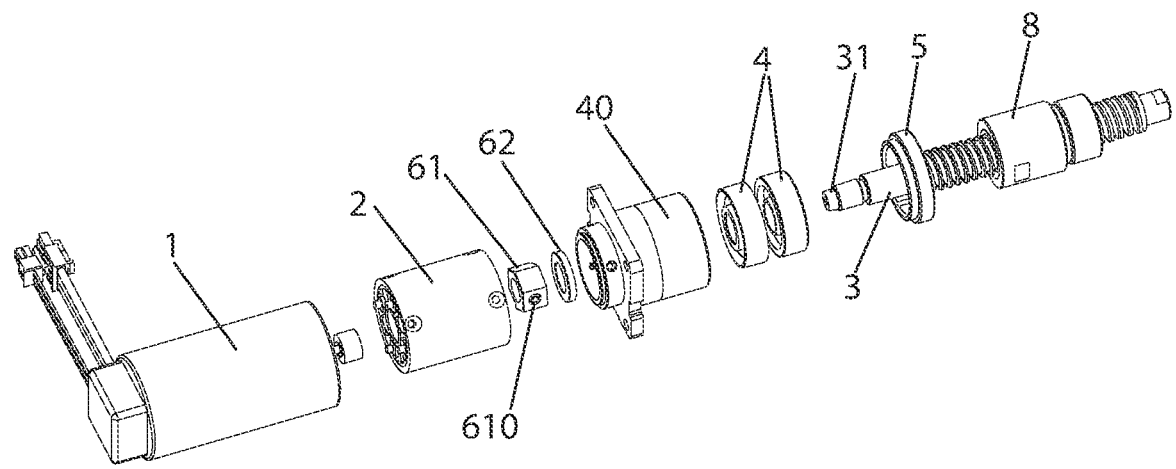
FIG. 1 is a schematic exploded view of a drive mechanism of an automatic door operator according to an embodiment of the present disclosure.
Figure 2:
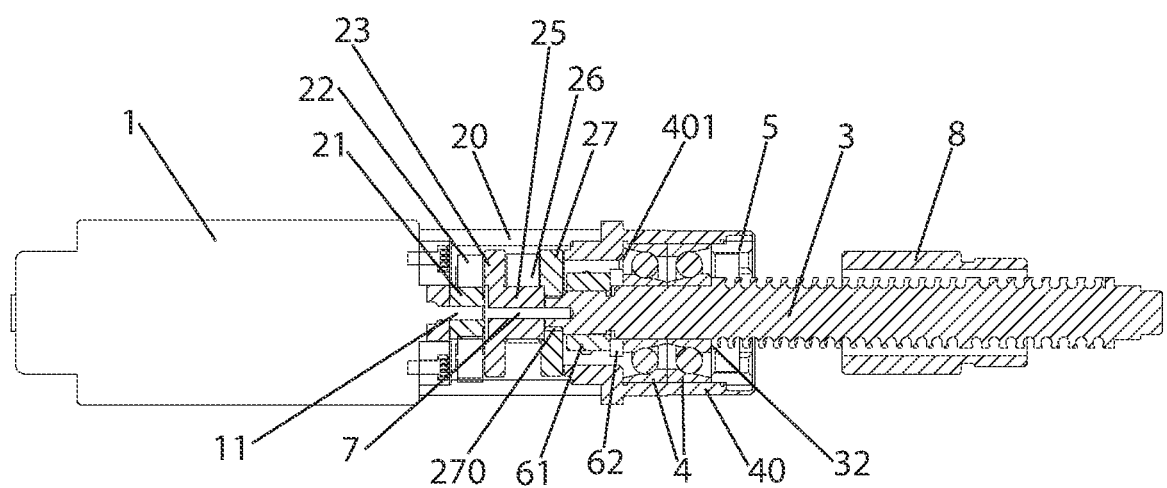
FIG. 2 is a schematic cross-sectional view of a drive mechanism of an automatic door operator according to an embodiment of the present disclosure.

FIG. 1 and FIG. 2 respectively illustrate an exploded view and a cross-sectional view of a drive mechanism of an automatic door operator provided by an embodiment of the present disclosure. The drive mechanism of the automatic door operator includes a planetary reducer 2 driven by an electric motor 1, and a drive shaft 3. The electric motor 1 may be any type of motor capable of rotating forward and backward. The planetary reducer 2 includes a housing 20 and a planetary gear train mounted in the housing 20. The planetary gear train includes a final-stage planet carrier 27 configured to output torque, and a center of the final-stage planet carrier 27 is provided with a torque output hole 270. A first end of the drive shaft 3 is detachably inserted in the torque output hole 270 and is non-rotatably connected to the torque output hole 270, such that when the final-stage planet carrier 27 rotates, the drive shaft 3 is driven by the final-stage planet carrier 27 to rotate. A second end of the drive shaft 3 extends out of the housing 20.

The planetary reducer 2 may be a one-stage planetary reducer, a two-stage planetary reducer or a planetary reducer with more stages. It should be noted that the final-stage planet carrier described herein refers to a planet carrier in the last stage planetary gear train. Specifically, for example, the one-stage planetary reducer has only one-stage planetary gear train, so its first-stage planet carrier and final-stage planet carrier is the same one. The two-stage planetary reducer has two stages of planetary gear trains, and the second-stage planet carrier of the two-stage planetary reducer acts as the final-stage planet carrier. Similarly, it can be understood that the multi-stage planetary reducer has a plurality of stages of planetary gear trains, and the planet carrier in the last stage planetary gear train of the multi-stage planetary reducer acts as the final-stage planet carrier.

The planetary reducer 2 is a two-stage planetary reducer in this embodiment. In addition to the above-mentioned final-stage planetary carrier 27, the planetary gear train of the planetary reducer 2 further including a first-stage sun gear 21, a first-stage planet gear 22, a first-stage planet carrier 23, a second-stage sun gear 25 and a second-stage planet carrier 26. An output shaft 11 of the electric motor 1 is connected to the first-stage sun gear 21, and the first-stage planet gear 22 is mounted on the first-stage planet carrier 23 and engaged with the first-stage sun gear 21. The second-stage sun gear 25 and the first-stage planet carrier 23 are attached together or integrally formed. The second-stage sun gear 25 is engaged with the second-stage planet gear 26 which is mounted on the final-stage planet carrier 27. It can be understood that the final-stage planet carrier 27 is the second-stage planet carrier of the two-stage planetary reducer.

The drive shaft 3 may be configured as a bevel gear shaft, a lead screw or a worm. When the drive shaft 3 is a bevel gear shaft, a rockerarm connecting shaft (not shown) of the automatic door operator is provided with a bevel gear portion. An axis of drive shaft 3 is perpendicular to an axis of the rockerarm connecting shaft, and a bevel gear of the drive shaft 3 is engaged with the bevel gear portion of the rockerarm connecting shaft. When the drive shaft 3 is a worm, the rockerarm connecting shaft is provided with a worm gear portion engaged with the worm.

In this embodiment, the drive shaft 3 is preferably a lead screw. In this case, the drive mechanism of the automatic door operator may further include a lead screw nut 8 and a rack (not shown) connected to the lead screw nut 8 in a non-rotatably manner. An axis of the rockerarm connecting shaft (not shown) of the automatic door operator is perpendicular to an axis of the drive shaft 3, and the rockerarm connecting shaft is provide with a gear portion that is engaged with the rack. When the automatic door operator is working, a rotation output from the electric motor 1 is transmitted to the drive shaft 3 via the planetary reducer 2, then a rotation of the drive shaft 3 is converted into a movement of the rack in an axial direction via the lead screw drive mechanism, and then the movement of the rack in an axial direction is converted into a rotation of the rockerarm connecting shaft via the gear-rack drive mechanism. By combining with the known technology in the field, it can be known that the rockerarm connecting shaft is used to be connected to the rocker arm system, so that the door can be manipulated to open or close through the rocker arm system.

In the drive mechanism provided by the present embodiment, the planetary reducer 2 is configured in such a way that no output shaft is provided, but a torque output hole 270 is provided at the center of the final stage carrier 27, and the drive shaft 3 is non-rotatably connected to the torque output hole 270 of the final stage planet carrier 27 directly. Therefore, the coupling for connecting the planetary reducer and the drive shaft can be omitted, thereby simplifying the configuration of the automatic door operator, facilitating to shorten an axial length of the automatic door operator, and further facilitating the miniaturization design of the automatic door operator while saving costs.

There are many manners for achieving the non-rotatably connection between the first end of the drive shaft 3 and the torque output hole 270. For example in a manner not shown, the torque output hole is connected to the drive shaft 3 by splined connection. Preferably, in this embodiment, the first end of the drive shaft 3 is provided with at least one first cutting surface 31, and the torque output hole 270 is provided with at least one second cutting surface (not shown). The first cutting surface 31 is engaged to the second cutting surface so that relative rotation between the torque output hole 270 and the drive shaft 3 is limited.

In addition, in order to form a reliable support for the first end of the drive shaft 3 to ensure the running accuracy and reliability of the drive shaft 3, at least one bearing 4 for supporting the drive shaft 3 is sleeved on the drive shaft 3. As can be seen in FIG. 2, the bearing 4 is adjacent to the first end of the drive shaft 3 and is supported by a bearing seat 40 mounted to the housing 20. The bearing 4 may be a ball bearing, a roller bearing or other types of bearing. Preferably, the at least one bearing 4 includes at least one pair of angular contact ball bearings which are disposed adjacent to each other, so that the drive shaft 3 can support a large axial load. In this embodiment, specifically, the at least one bearing 4 only includes one pair of angular contact ball bearings disposed in close proximity to each other.

A preferred embodiment of an axial limiting structure for the one pair of angular contact ball bearings is shown in FIG. 2. Specifically, an inner surface of the bearing seat 40 is provided with a first step 401 configured to limit an outer ring of a first end of the bearing 4, and the bearing seat 40 is screwed with an annular member 5 configured to limit an outer ring of a second end of the bearing 4. The annular member 5 abuts against the end face of the outer ring of the second end of the bearing 4. The drive shaft 3 is screwed with a nut 61, a retaining ring 62 is disposed between the nut 61 and an inner ring of the first end of the bearing 4, and the retaining ring 62 abuts against the end face of the inner ring of the first end of the bearing 4. The drive shaft 3 is provided with a shoulder 32 configured to limit an inner ring of the second end of the bearing 4. Preferably, the nut 61 is provided with a radial hole 610 in which a set screw (not shown) configured to abut against the drive shaft 3 is mounted, in order to prevent the connection between the nut 61 and the drive shaft 3 from becoming loose.

Referring to FIG. 2 again, preferably, the first-stage planet carrier 23 and the second-stage sun gear 25 are configured to a one-piece structure. A center of the first-stage planet carrier 23 is provided with a through hole (not marked), the center of the first end face of the drive shaft 3 is provided with a pin mounting hole (not marked), and a pin 7 is mounted in the through hole and the pin mounting hole. The pin acts as a center of the drive shaft 3 and is not used to limit the relative rotation between the second-stage sun gear 25 and the drive shaft 3.

The embodiment of the present disclosure further provides an automatic door operator provided with the above-described drive mechanism.

The above-mentioned embodiments are merely illustrative of several embodiments of the present disclosure, and the description thereof is more specific and detailed, but it is not to be construed as limiting the scope of the present disclosure. It should be noted that a number of variations and modifications may be made by those skilled in the art without departing from the spirit and scope of the invention. Therefore, the scope of the invention should be determined by the appended claims.

The invention claimed is:

1. A drive mechanism, applied to an automatic door operator, the drive mechanism including a planetary reducer driven by an electric motor, and a drive shaft driven by the planetary reducer, wherein:
the planetary reducer includes a housing and a planetary gear train mounted in the housing;
the planetary gear train includes a final-stage planet carrier configured to output torque, and a center of the final-stage planet carrier is provided with a torque output hole; and
a first end of the drive shaft is detachably inserted in the torque output hole and is non-rotatably connected to the torque output hole, and a second end of the drive shaft extends out of the housing, wherein the first end of the drive shaft is provided with a first cutting surface, and the torque output hole is provided with a second cutting surface, the first cutting surface being engaged to the second cutting surface so that relative rotation between the torque output hole and the drive shaft is limited.

2. The drive mechanism according to claim 1, wherein the drive shaft is configured as a bevel gear shaft, a lead screw or a worm.

3. The drive mechanism according to claim 2, wherein at least one bearing is sleeved on the drive shaft, and the bearing is adjacent to the first end of the drive shaft and is supported by a bearing seat mounted to the housing.

4. The drive mechanism according to claim 3, wherein the at least one bearing includes at least one pair of angular contact ball bearings disposed adjacent to each other.

5. The drive mechanism according to claim 2, wherein:
the planetary gear train further includes a first-stage sun gear, a first-stage planet gear, a first-stage planet carrier, a second-stage sun gear and a second-stage planet carrier;
an output shaft of the electric motor is connected to the first-stage sun gear, and the first-stage planet gear is mounted on the first-stage planet carrier and engaged with the first-stage sun gear; and
the second-stage sun gear and the first-stage planet carrier are attached together or integrally formed, and the second-stage sun gear is engaged with the second-stage planet gear mounted on the final-stage planet carrier.

6. An automatic door operator, provided with the drive mechanism according to claim 1.

7. A drive mechanism applied to an automatic door operator, the drive mechanism including a planetary reducer driven by an electric motor, and a drive shaft driven by the planetary reducer, wherein:
the planetary reducer includes a housing and a planetary gear train mounted in the housing;
the planetary gear train includes a final-stage planet carrier configured to output torque, and a center of the final-stage planet carrier is provided with a torque output hole; and
a first end of the drive shaft is detachably inserted in the torque output hole and is non-rotatably connected to the torque output hole, and a second end of the drive shaft extends out of the housing,
wherein the drive shaft is configured as a bevel gear shaft, a lead screw or a worm,
wherein at least one bearing is sleeved on the drive shaft, and the bearing is adjacent to the first end of the drive shaft and is supported by a bearing seat mounted to the housing, wherein the at least one bearing includes at least one pair of angular contact ball bearings disposed adjacent to each other,
wherein an inner surface of the bearing seat is provided with a first step configured to limit an outer ring of a first end of the bearing, and the bearing seat is screwed with an annular member configured to limit an outer ring of a second end of the bearing;
wherein the drive shaft is screwed with a nut, and a retaining ring is disposed between the nut and an inner ring of the first end of the bearing; and
wherein the drive shaft is provided with a shoulder configured to limit an inner ring of the second end of the bearing.

8. The drive mechanism according to claim 7, wherein the nut is provided with a radial hole, the mechanism further comprising a set screw configured to mount with the radial hole to abut against the drive shaft.

9. A drive mechanism applied to an automatic door operator, the drive mechanism including a planetary reducer driven by an electric motor, and a drive shaft driven by the planetary reducer, wherein:
the planetary reducer includes a housing and a planetary gear train mounted in the housing;
the planetary gear train includes a final-stage planet carrier configured to output torque, and a center of the final-stage planet carrier is provided with a torque output hole; and
a first end of the drive shaft is detachably inserted in the torque output hole and is non-rotatably connected to the torque output hole, and a second end of the drive shaft extends out of the housing,
wherein the drive shaft is configured as a bevel gear shaft, a lead screw or a worm,
wherein the planetary gear train further includes a first-stage sun gear, a first-stage planet gear, a first-stage planet carrier, a second-stage sun gear and a second-stage planet carrier;
wherein an output shaft of the electric motor is connected to the first-stage sun gear, and the first-stage planet gear is mounted on the first-stage planet carrier and engaged with the first-stage sun gear; and
the second-stage sun gear and the first-stage planet carrier are attached together or integrally formed, and the second-stage sun gear is engaged with the second-stage planet gear mounted on the final-stage planet carrier,
wherein a center of the first-stage planet carrier is provided with a through hole, a center of a first end face of the drive shaft is provided with a pin mounting hole, and a pin is mounted in the through hole and the pin mounting hole.

\* \* \* \* \*